United States Patent
Piao et al.

(10) Patent No.: US 12,085,291 B2
(45) Date of Patent: Sep. 10, 2024

(54) DUAL MODE CONVERTER FOR AIR CONDITIONING SYSTEM

(71) Applicant: Carrier Corporation, Palm Beach Gardens, FL (US)

(72) Inventors: Chengzhu Piao, East Meadow, NY (US); Konstantin Borisov, Avon, CT (US); Ismail Agirman, Southington, CT (US)

(73) Assignee: CARRIER CORPORATION, Palm Beach Gardens, FL (US)

( * ) Notice: Subject to any disclaimer, the term of this patent is extended or adjusted under 35 U.S.C. 154(b) by 216 days.

(21) Appl. No.: 17/880,145

(22) Filed: Aug. 3, 2022

(65) Prior Publication Data

US 2023/0059776 A1 Feb. 23, 2023

Related U.S. Application Data

(60) Provisional application No. 63/234,869, filed on Aug. 19, 2021.

(51) Int. Cl.
*F24F 1/20* (2011.01)
*H02M 5/458* (2006.01)

(52) U.S. Cl.
CPC .............. *F24F 1/20* (2013.01); *H02M 5/4585* (2013.01)

(58) Field of Classification Search
CPC ...... F24F 1/20; H02H 5/4585; H02M 1/0054; H02M 7/487; H02M 1/0032; Y02B 70/10
See application file for complete search history.

(56) References Cited

U.S. PATENT DOCUMENTS

| | | | |
|---|---|---|---|
| 8,817,505 B2 | 8/2014 | Ichiki | |
| 2014/0265945 A1 | 9/2014 | Deboy | |
| 2015/0219378 A1* | 8/2015 | Crane | F25B 49/022 62/201 |
| 2015/0349654 A1 | 12/2015 | Wang et al. | |
| 2021/0159807 A1 | 5/2021 | She et al. | |

FOREIGN PATENT DOCUMENTS

| | | | |
|---|---|---|---|
| CN | 101523710 A * | 9/2009 | ......... H02M 3/1582 |
| CN | 102136731 A | 7/2011 | |
| CN | 204597799 U | 8/2015 | |

(Continued)

OTHER PUBLICATIONS

European Search Report for Application No. 22188401.8; Issued Jan. 9, 2023; 6 Pages.

(Continued)

*Primary Examiner* — Emmanuel E Duke
(74) *Attorney, Agent, or Firm* — CANTOR COLBURN LLP

(57) ABSTRACT

A converter includes an input section including an inductive element, the input section configured to receive a multi-phase, AC input voltage; a rectifier section coupled to the input section; a voltage regulator section coupled to the rectifier section, the voltage regulator section configured to control a DC output voltage across a positive DC bus and a negative DC bus; and a controller in communication with the voltage regulator section, the controller configured to command the voltage regulator section to operate in one of a first mode and a second mode.

11 Claims, 3 Drawing Sheets

(56) References Cited

FOREIGN PATENT DOCUMENTS

| | | |
|---|---|---|
| CN | 106329969 A | 1/2017 |
| CN | 106549591 A | 3/2017 |
| CN | 108988667 A | 12/2018 |
| CN | 109495001 A | 3/2019 |
| CN | 109787491 A | 5/2019 |
| CN | 110138075 A | 8/2019 |
| CN | 110380633 A | 10/2019 |
| CN | 209626973 U | 11/2019 |
| CN | 110581643 A | 12/2019 |
| CN | 210053351 U | 2/2020 |
| CN | 111030442 A | 4/2020 |
| CN | 111130333 A | 5/2020 |
| CN | 110855165 B | 9/2020 |
| CN | 111628540 A | 9/2020 |
| CN | 111628660 A | 9/2020 |
| CN | 111884523 A | 11/2020 |
| CN | 212457336 U | 2/2021 |
| CN | 112467964 A | 3/2021 |
| EP | 3672055 A1 * | 6/2020 |

OTHER PUBLICATIONS

Author Unknown "Vienna Rectifier-Based, Three-Phase Power Factor Correction (PFC) Reference Design Using C2000TM MCU" Texas Instrument; Nov. 2016; Revised Jun. 2017; 54 Pages.

\* cited by examiner

DUAL MODE CONVERTER FOR AIR CONDITIONING SYSTEM

CROSS-REFERENCE TO RELATED APPLICATIONS

This application claims the benefit of Provisional Application No. 63/234,869 filed Aug. 19, 2021, the disclosure of which is incorporated herein by reference in its entirety.

BACKGROUND

Exemplary embodiments of this disclosure pertain to the art of alternating current (AC) to direct current (DC) converters, and more specifically, to a dual mode AC-DC converter for an air conditioning system. Air conditioning systems often employ an AC-DC converter to convert multiphase, AC input voltage (main or grid power) to a DC voltage. The DC voltage is then supplied to an inverter to produce a multiphase, AC output voltage. The multiphase, AC output voltage is provided to a multiphase motor that drives components of the air conditioning system, such as a compressor.

BRIEF DESCRIPTION

According to an embodiment, a converter includes an input section including an inductive element, the input section configured to receive a multiphase, AC input voltage: a rectifier section coupled to the input section: a voltage regulator section coupled to the rectifier section, the voltage regulator section configured to control a DC output voltage across a positive DC bus and a negative DC bus; and a controller in communication with the voltage regulator section, the controller configured to command the voltage regulator section to operate in one of a first mode and a second mode.

In addition to one or more of the features described herein, or as an alternative, further embodiments may include wherein the rectifier section includes a rectifier leg including a first diode and a second diode.

In addition to one or more of the features described herein, or as an alternative, further embodiments may include wherein the voltage regulator section includes a pair of switches connected to a junction of the first diode and the second diode.

In addition to one or more of the features described herein, or as an alternative, further embodiments may include wherein the first mode includes no switching of the pair of switches and the second mode includes active switching of the pair of switches.

In addition to one or more of the features described herein, or as an alternative, further embodiments may include wherein controller is configured to command the voltage regulator section to operate in one of the first mode and the second mode in response to load on the air conditioning system.

In addition to one or more of the features described herein, or as an alternative, further embodiments may include wherein the voltage regulator section operates in the first mode when load on the air conditioning system is less than a threshold.

In addition to one or more of the features described herein, or as an alternative, further embodiments may include wherein the voltage regulator section operates in the second mode when load on the air conditioning system is greater than the threshold.

In addition to one or more of the features described herein, or as an alternative, further embodiments may include wherein the first diode is connected to the positive DC bus and the second diode is connected to the negative DC bus.

In addition to one or more of the features described herein, or as an alternative, further embodiments may include wherein the input section includes a damping resistor network connected to one or more phases of the multiphase, AC input voltage.

According to another embodiment, an air conditioning system includes a compressor, condenser and evaporator: an inverter providing a multiphase, AC output voltage to the compressor: a converter configured to generate a DC output voltage across a positive DC bus and a negative DC bus, the DC output voltage supplied to the inverter: the converter including: an input section including an inductive element, the input section configured to receive a multiphase, AC input voltage: a rectifier section coupled to the input section: and a voltage regulator section coupled to the rectifier section, the voltage regulator section configured to control a DC output voltage across a positive DC bus and a negative DC bus: a controller in communication with the voltage regulator section, the controller configured to command the voltage regulator section to operate in one of a first mode and a second mode.

According to another embodiment, a method of controlling a converter in an air conditioning system includes initiating operation of the air conditioning system: monitoring a load on the air conditioning system: operating the converter in one of a first mode and a second mode in response to the load on the air conditioning system.

Technical effects of embodiments of this disclosure include the ability to operate a converter in multiple modes in response to load on an air conditioning system.

Additional technical features and benefits are realized through the techniques of the present disclosure. Embodiments and aspects of the disclosure are described in detail herein and are considered a part of the claimed subject matter. For a better understanding, refer to the detailed description and to the drawings.

BRIEF DESCRIPTION OF THE DRAWINGS

The following descriptions should not be considered limiting in any way. With reference to the accompanying drawings, like elements are numbered alike.

DETAILED DESCRIPTION

A detailed description of one or more embodiments of the disclosed apparatus and method are presented herein by way of exemplification and not limitation with reference to the Figures.

Figure 1:
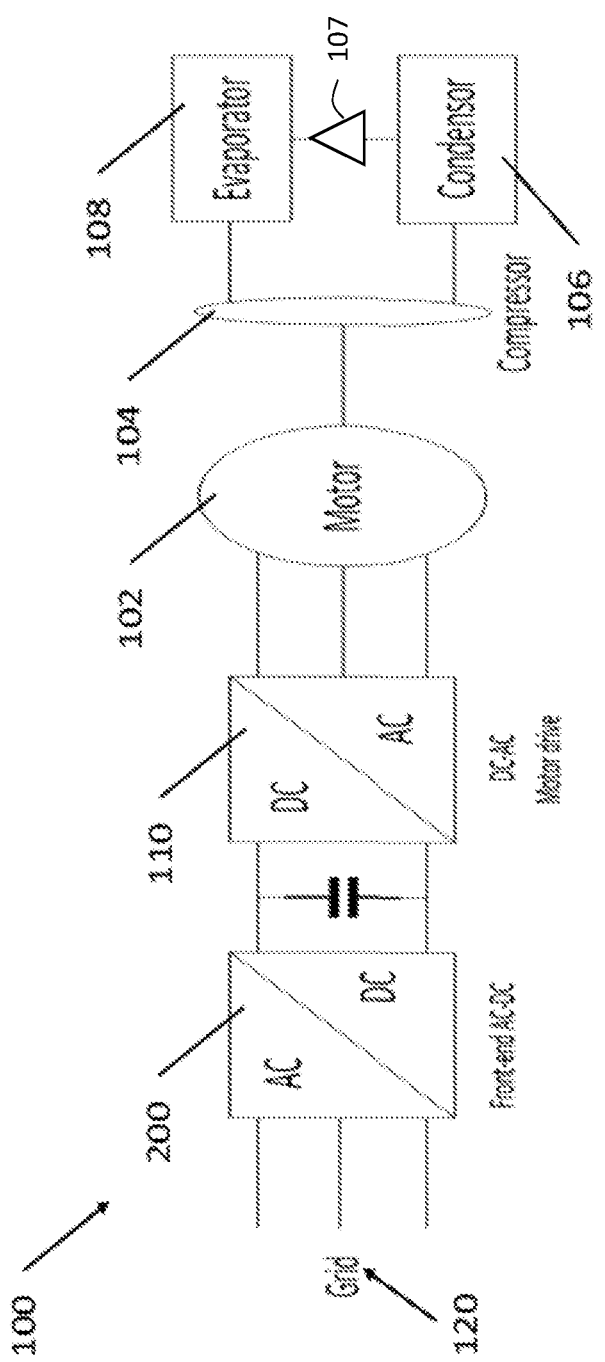
FIG. 1 is a block diagram of an air conditioning system in an example embodiment.

FIG. 1 is a block diagram of air conditioning system 100 in an example embodiment. The air conditioning system 100 may be configured to condition air in a building, such as a chiller, roof top unit, heat pump, etc. The air conditioning system 100 may be configured to condition air for refrigerated environments, such as a refrigerated container, a refrigerated trailer, refrigerator/freezer, etc.

The air conditioning system 100 includes a variable speed motor 102 that is coupled to a compressor 104. The compressor 104 includes an impeller/rotor that rotates and compresses liquid refrigerant to a superheated refrigerant vapor for delivery to a condenser 106. In the condenser 106, the refrigerant vapor is liquefied at high pressure and rejects heat (e.g., to the outside air via a condenser fan in an air-cooled application). The liquid refrigerant exiting condenser 106 is delivered to an evaporator 108 through an expansion valve 107. The refrigerant passes through the expansion valve 107 where a pressure drop causes the high-pressure liquid refrigerant to achieve a lower pressure combination of liquid and vapor. As fluid passes the evaporator 108, the low-pressure liquid refrigerant evaporates, absorbing heat from the fluid, thereby cooling the fluid and evaporating the refrigerant. The low-pressure refrigerant is again delivered to compressor 104 where it is compressed to a high-pressure, high temperature gas, and delivered to condenser 106 to start the refrigeration cycle again. It is to be appreciated that while a specific air conditioning system is shown in FIG. 1, the present teachings are applicable to any air conditioning system.

As shown in FIG. 1, the compressor 104 driven by a variable speed motor 102 from power supplied from a multiphase, AC input voltage 120 (grid or mains) through an AC-DC converter 200 and a DC-AC inverter 110. The inverter 110 includes solid-state electronics to produce multiphase, AC output voltage. In an embodiment, inverter 110 converts the DC voltage from the converter 200 into a multiphase, AC output voltage, at a desired frequency and/or magnitude in order to drive the multiphase motor 102. Such inverters 110 are known in the art.

Figure 2:
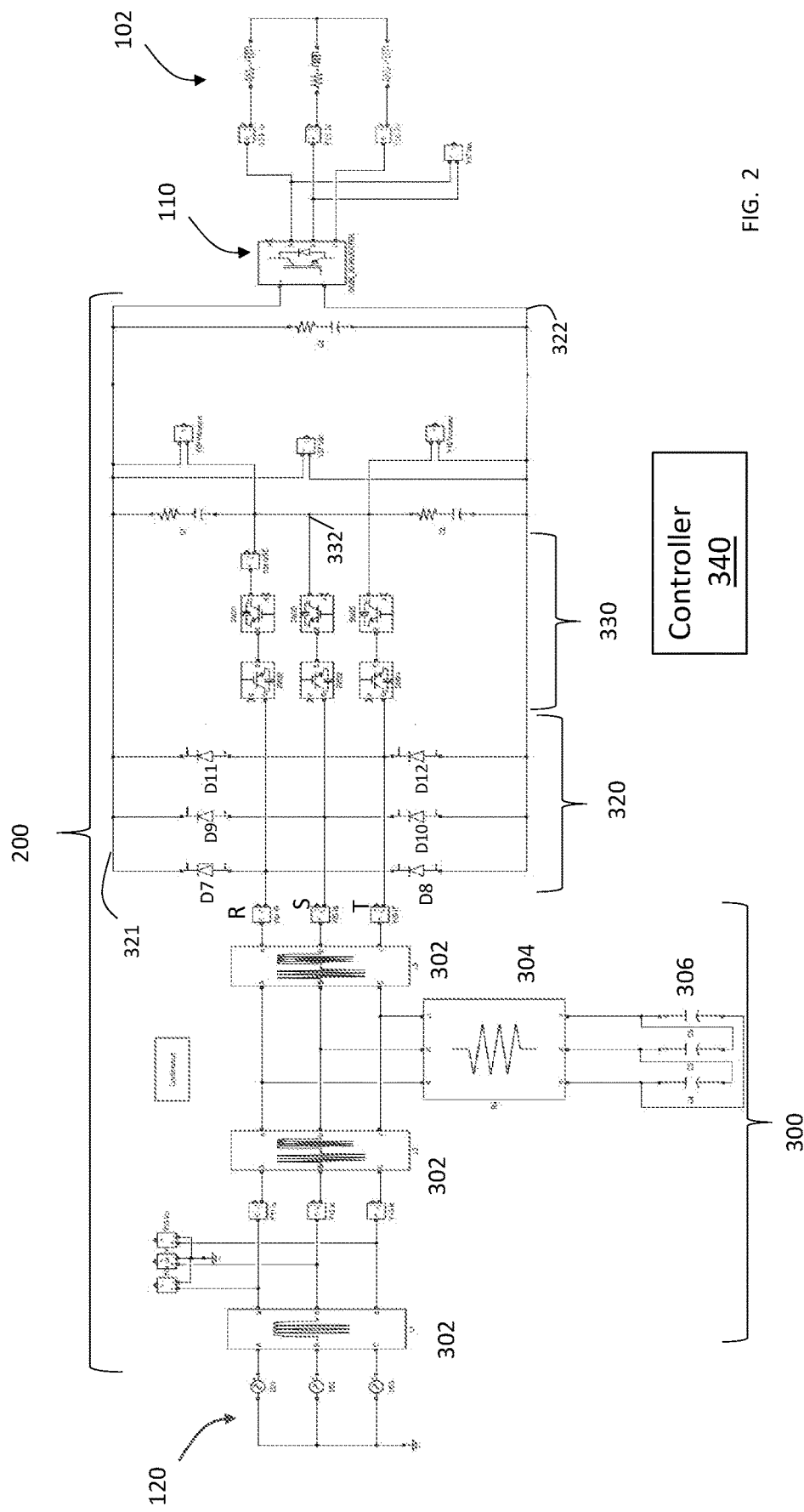
FIG. 2 is a schematic diagram of a converter, inverter, and motor in an example embodiment.

FIG. 2 is a schematic diagram of a converter 200, along with the multiphase, AC input voltage 120, the inverter 110 and the motor 102 in an example embodiment. The converter 200 includes an input section 300 through which the multiphase, AC input voltage 120 is filtered by one or more inductive elements 302. A damping resistor network 304 is connected to each phase of the multiphase, AC input voltage 120 to control unwanted resonance in the multiphase, AC input voltage 120. A capacitor network 306 is connected to the damping resistor network 304 to provide frequency control and reduce noise in the multiphase, AC input voltage 120.

The converter 200 includes a rectifier section 320 having a plurality of rectifier legs. The number of rectifier legs equals the number of phases of the AC input voltage 120, shown as phases R, S and T, at the input to the rectifier section 320. Each rectifier leg includes a pair diodes. As shown in FIG. 2, diodes D7 and D8 define a first rectifier leg, diodes D9 and D10 define a second rectifier leg and diodes D11 and D12 define a third rectifier leg. The cathode of diode D7 is connected to a positive DC bus 321, the anode of diode D7 is connected to phase R of the multiphase, AC input voltage 120, the cathode of diode D8 is connected to phase R of the multiphase, AC input voltage 120 and the anode of diode D8 is connected to a negative DC bus 322. Diodes D9-D12 are arranged in a similar manner, with respect to phases S and T of the multiphase, AC input voltage 120.

The converter 200 includes a voltage regulator section 330 having a plurality of voltage regulator legs. The number of voltage regulator legs equals the number of phases of the multiphase, AC input voltage 120, shown as phases R, S and T at the input to the voltage regulator section 330. Each voltage regulator leg includes a pair of switches. As shown in FIG. 2, switches SW20 and SW21 define a first voltage regulator leg, switches SW22 and SW23 define a second voltage regulator rectifier leg and switches SW24 and SW25 define a third voltage regulator leg. Switches SW20-SW25 can be any type of switch including, but not limited to, an insulated gate bipolar transistor (IGBT) or a metal-oxide-semiconductor field effect transistor (MOSFET). A capacitor C1 is connected between the positive DC bus 321 and the neutral point 332. A capacitor C2 is connected between the negative DC bus 322 and the neutral point 332. A capacitor C3 is connected between the positive DC bus 321 and the negative DC bus 322. Capacitors C1, C2 and C3 provide for filtering and smoothing of the DC voltage on the positive DC bus 321 and the negative DC bus 322.

A controller 340 operates to monitor one or more parameters of the converter 200, inverter 110 and/or the motor 102, and control switches SW20-SW25 accordingly. The controller 340 may be implemented using a general-purpose microprocessor executing a computer program stored on a storage medium to perform the operations described herein. Alternatively, the controller 340 may be implemented in hardware (e.g., ASIC, FPGA) or in a combination of hardware/software. The controller 340 may also be part of an air conditioning control system. The controller 340 may monitor voltage and/or current at the motor 102 in order to determine a load on the air conditioning system 100. The controller 340 may monitor voltage and/or current at the motor 102 using sensors (not shown). The controller 340 may monitor load of the air conditioning system 100 by monitoring one or more parameters (e.g., speed, discharge pressure, discharge temperature) of the compressor 104 using sensors (not shown).

The output DC voltage of the converter 200 is provided across the positive DC bus 321 and the negative DC bus 322. The output DC voltage of the converter 200 is provided to the inverter 110. The inverter 110 may be implemented using known multilevel, multiphase inverter topologies (e.g., a multiphase, T-type inverter, two level inverter). The output of the inverter 110 is a multiphase, AC output voltage which is provided to the phase windings U, V, W of the motor 102. The inverter 110 may be controlled by the controller 340 using known signaling (e.g., PWM control).

Figure 3:
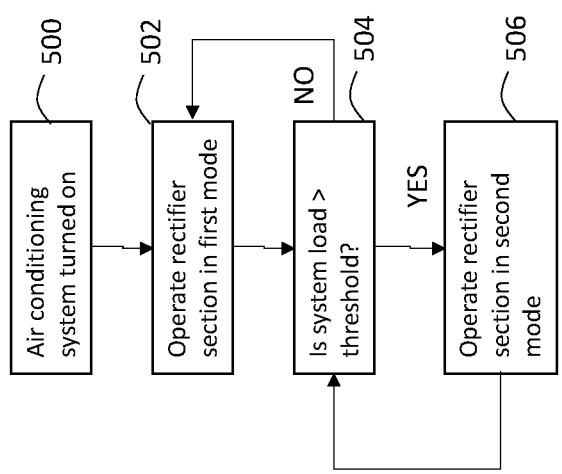
FIG. 3 is a flowchart of a process for controlling a converter in an example embodiment.

FIG. 3 is a flowchart of a process for controlling the converter 200 in an example embodiment. The process is implemented by controller 340. The process begins when the air conditioning system 100 is turned on at 500. At 502, the controller 340 controls switches SW20-SW25 into an open state to provide a first mode of rectification in the rectifier section 320 through the diodes D7 through D12. The controller 340 also controls switches in inverter 110 an active manner (e.g., through PWM signals) to provide active voltage regulation to the motor 102. At 504, the controller 340 determines if the load on the air conditioning system 100 is greater than a threshold. The threshold may be represented as a percentage, such as 10-15% of maximum load of the air conditioning system 100. The load on the air conditioning system 100 may be determined in response to one or more parameters of the air conditioning system 100, such as one or more of motor 102 current, motor 102 voltage, compressor 104 speed, compressor 104 discharge pressure, etc.

At 504, if the load on the air conditioning system 100 is below the threshold, the process returns to 502 to continue to operate the rectifier section 320 in the first mode (e.g., passive rectification through diodes D07-D12). At 504, if the load on the air conditioning system 100 is greater than the threshold, flow proceeds to 506, where the controller 340 begins actively control switches SW20-SW25 with PWM signals to provide a second mode of rectification in the rectifier section 320 and the voltage regulator section 330. The second mode of rectification uses switches SW20 and SW25 as an active bridge rectifier also known as Vienna rectifier. From 506, the process reverts to 504 where the controller 340 continues to monitor load on the air conditioning system 100 and uses either the first mode of rectification or the second mode of rectification, in response to load on the air conditioning system 100. The process ends when the air conditioning system 100 is turned off.

Embodiments of the disclosure allow for operation of an AC-DC converter in two modes. At low loads, the converter 200 is operated in a first mode in and has higher total harmonic current distortion (THD), typically associated with lower load operation. As the load increases, the converter 200 is operated in a second mode to achieve benefits associated with low harmonic THD and Vienna rectifiers. By using two modes, drawbacks of the DC bus voltage control and current control loops instability can be avoided. The instability at light load with no first mode of operation causes overcurrent and overvoltage and system shutdown.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. A converter comprising:
    an input section including an inductive element, the input section configured to receive a multiphase, AC input voltage;
    a rectifier section coupled to the input section;
    a voltage regulator section coupled to the rectifier section, the voltage regulator section configured to control a DC output voltage across a positive DC bus and a negative DC bus; and
    a controller in communication with the voltage regulator section, the controller configured to command the voltage regulator section to operate in one of a first mode and a second mode.

2. The converter of claim 1, wherein the rectifier section includes a rectifier leg including a first diode and a second diode.

3. The converter of claim 2, wherein the voltage regulator section includes a pair of switches connected to a junction of the first diode and the second diode.

4. The converter of claim 3, wherein the first mode includes no switching of the pair of switches and the second mode includes active switching of the pair of switches.

5. The converter of claim 2, wherein the first diode is connected to the positive DC bus and the second diode is connected to the negative DC bus.

6. The converter of claim 1, wherein controller is configured to command the voltage regulator section to operate in one of the first mode and the second mode in response to load on the air conditioning system.

7. The converter of claim 6, wherein the voltage regulator section operates in the first mode when load on the air conditioning system is less than a threshold.

8. The converter of claim 7, wherein the voltage regulator section operates in the second mode when load on the air conditioning system is greater than the threshold.

9. The converter of claim 1, wherein the input section includes a damping resistor network connected to one or more phases of the multiphase, AC input voltage.

10. An air conditioning system comprising:
    a compressor, condenser and evaporator;
    an inverter providing a multiphase, AC output voltage to the compressor;
    a converter configured to generate a DC output voltage across a positive DC bus and a negative DC bus, the DC output voltage supplied to the inverter;
    the converter including:
        an input section including an inductive element, the input section configured to receive a multiphase, AC input voltage;
        a rectifier section coupled to the input section; and
        a voltage regulator section coupled to the rectifier section, the voltage regulator section configured to control a DC output voltage across a positive DC bus and a negative DC bus;
    a controller in communication with the voltage regulator section, the controller configured to command the voltage regulator section to operate in one of a first mode and a second mode.

11. A method of controlling a converter in an air conditioning system, the method comprising:
    initiating operation of the air conditioning system;
    monitoring a load on the air conditioning system;
    operating the converter in one of a first mode and a second mode in response to the load on the air conditioning system.

* * * * *